United States Patent
Gaurav et al.

(10) Patent No.: US 9,706,379 B2
(45) Date of Patent: Jul. 11, 2017

(54) METHOD AND SYSTEM FOR GENERATION AND TRANSMISSION OF ALERT NOTIFICATIONS RELATING TO A CROWD GATHERING

(71) Applicant: HONEYWELL INTERNATIONAL INC., Morris Plains, NJ (US)

(72) Inventors: Galib Gaurav, Bihar (IN); Srjdhar Ganta, Karnataka (IN); Divyashree Krishnamurthy, Karnataka (IN); Shankar Prasad, Karnataka (IN); Chandrasekhar Ramamoorthi, Karnataka (JP); Parashuram Aravinda Osekar, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/873,329

(22) Filed: Oct. 2, 2015

(65) Prior Publication Data
US 2016/0100301 A1    Apr. 7, 2016

(51) Int. Cl.
*H04W 4/22* (2009.01)
*H04W 4/02* (2009.01)
*H04W 4/12* (2009.01)

(52) U.S. Cl.
CPC .............. *H04W 4/22* (2013.01); *H04W 4/023* (2013.01); *H04W 4/12* (2013.01)

(58) Field of Classification Search
None
See application file for complete search history.

(56) References Cited

U.S. PATENT DOCUMENTS

| | | | |
|---|---|---|---|
| 2016/0061625 A1* | 3/2016 | Wang | G01C 21/3697 701/454 |
| 2016/0112445 A1* | 4/2016 | Abramowitz | G06Q 40/08 726/23 |

* cited by examiner

*Primary Examiner* — Diane Mizrahi
(74) *Attorney, Agent, or Firm* — Husch Blackwell LLP

(57) ABSTRACT

A method for transmitting alert messages relating to a crowd gathering to one or more user devices in a communication network comprising the steps of receiving data from one or more data sources at a central alert system, wherein said data comprises the geo-location of the crowd gathering; classifying the crowd gathering based on processing the received data on one or more pre-determined criteria stored in the central alert system; identifying the geo-location of one or more user devices in proximity to the identified geo-location of the crowd gathering; generating an alert message based on the classification of the crowd gathering; and transmitting the generated alert messages to the one or more user devices.

18 Claims, 4 Drawing Sheets

METHOD AND SYSTEM FOR GENERATION AND TRANSMISSION OF ALERT NOTIFICATIONS RELATING TO A CROWD GATHERING

FIELD OF THE INVENTION

The present invention relates to a method and system for transmitting alert notifications regarding crowd gatherings to user(s) based on their geo-location. In particular the present invention relates to a method and system for collecting and processing information regarding crowd gathering based on the location of the crowd gathering, and based on the information processed, initiating and transmitting alert messages to users in close proximity of the crowd gathering.

BACKGROUND OF THE INVENTION

Crowd gathering or the presence of a crowd is a common phenomenon in modern day society. Gatherings may occur for various reasons and in various places such as at festivals, shopping malls, live performances, religious programs, celebrity gatherings, airports, railway stations, bus terminals, etc. While many gatherings start and end peacefully, there always remains a possibility of unfortunate events occurring at a crowd gathering. For example, stampedes or crowd gathering driven violence resulting from a gathering which does not end peacefully can lead to damage to property and/or threat to life. An average individual either at the gathering or in close proximity thereto is usually uninformed and, therefore, unprepared to deal with volatility and threat to life and/or property in situations where the gathering gets unruly. Therefore, the average individual may not be able to protect himself or his loved ones in such a situation.

Efforts have been put forth in the past to gather data about crowd gatherings. For example, information regarding traffic conditions is routinely monitored by city authorities to possibly plan for resource allocation in areas that are experiencing high traffic build-up. In other instances, organizations like shopping mall owners/managers are using tools to collect information regarding the foot-fall at a shopping mall or, more specifically, a particular shop to understand consumer patterns etc. Most of the monitoring currently being used is through cameras installed at public places, the cameras having multi-directional counting features with algorithms that can gather information regarding crowds, shadows and non-human objects and provide key information relating to intensity of crowd gathering.

Examples of specific commercial products in the market are Crowd Optic and SceneTap. Crowd Optic, a developer of crowd-driven mobile solutions for enterprises, monitors crowd viewing, photo and video taking behavior in real time and recognizes clusters of wireless devices in the crowd gathering that are focused on the same zone. This allows the tool to give indications of center of focus and momentum, as well as any anomalous activity in the crowd gathering—based on the monitoring of the wireless device. SceneTap allows an end user to view real-time data on crowd sizes, gender ratios, and the average age of patrons in a given location, and hence can be used to monitor crowd demographics in a given location.

However, these current solutions do not analyze crowd behavior or have any rating or similar classification of a given crowd gathering. The current solutions also do not provide information regarding the nature and composition of a crowd gathering to a user who is in the vicinity of such a crowd gathering. Moreover, there is no product or service that collects and processes information on crowd behavior to generate alert messages relating to the crowd behavior, especially when the identified crowd gathering is posing a threat to the individual, and further transmits the alert messages to wireless devices based on the location of the user/device vis-à-vis the crowd gathering.

Therefore, despite the current solutions available to the public, when a user(s) is caught in the midst of an unknown frenzied crowd gathering, contacting a third party (e.g., family, friend or relative) or emergency services, using a telephone (wireless or otherwise) may not be feasible and hence, diverting help to the distressed user(s) may be delayed. Even in situations where the individual has prior information of a crowd gathering, the gathering may suddenly turn unruly and the above problem of contacting someone for assistance may be thwarted and/or delayed. This situation is more pronounced in countries with high population densities, where crowd gatherings can go up to millions in a short period of time. For example, in India, the 'Kumbh Mela' an annual gathering of pilgrims and tourists around the banks of the confluence of three rivers in northern India, attracts up to 70 million people over a period of 56 days. The foot fall in the area in question crosses several million per day during the peak days of the festival. Unfortunately, currently, there is no facility to notify individual user(s) of crowd behaviour that can escalate into damage of life and property. There is also no system or process in place that would notify the requisite authorities to precipitate assistance when crowd behaviour starts escalating to a point where threat to property and/or life becomes imminent. The response of civic bodies such as police, fire brigade, ambulance is initiated once the incident has happened i.e., after the crowd gathering has turned volatile which, in many instances may be too late.

Thus, situations exist where a crowd gathering culminates in a volatile situation that poses a threat to the safety of individuals who are inadvertently caught in such a situation and are not equipped to protect themselves. In view of this, there is a need for providing information, visual and/or textual, related to a crowd gathering to a user device to assist a user(s) to take necessary precautionary measures in order to avoid such crowd gatherings or to seek required safe and secured environment for himself, his family and his property when in close proximity to the crowd gathering. Accordingly, there is a need for a method and tool for determining crowd gathering behaviour based on, for example, processing of inputs from various sources; processing the information on the crowd gathering to classify the threat level to life or property; generating alert messages based on the classification of the crowd gathering; identifying user devices to transmit the alert messages, based on the proximity of the user(s) to the crowd gathering; and transmitting the message to the user device so as to equip the user with adequate information to prepare and plan for ways to avert the crowd gathering.

SUMMARY OF THE INVENTION

It is an object of the present invention to provide a method of collecting, processing and transmitting alert messages through a communication network including at least a primary user device and, optionally, at least a secondary user device. The method as explained in the present invention comprises the steps of identifying crowd gathering, determining the possibility of credible threat to a registered user(s) based on the crowd gathering location, analyzing the crowd behaviour based on predetermined metrics, classifying the threat, and based on user location, generating an alert message and transmitting the alert message to a registered primary and/or secondary user device.

The present invention also provides a Central Alert System for generating and transmitting alert messages to a user device, the system comprising a user registration module to register a user(s) and his details in the system, a crowd location module to locate possible crowd gatherings, a crowd classification module to analyze and classify the crowd gathering based on threat levels, a user location determination module for determining the location of the registered user(s), an alert generator module to generate alert based on the verification of the crowd data, and an alert transmitter module to finally transmit the alert message to the registered primary and/or secondary user device.

To foregoing and other objects, features and advantages of the invention will be apparent from the following detailed description in conjunction with the drawings described hereinafter. It is appreciated that these drawings depict only typical embodiments of the invention and are therefore not to be considered limiting in its scope.

DETAILED DESCRIPTION

Figure 1:
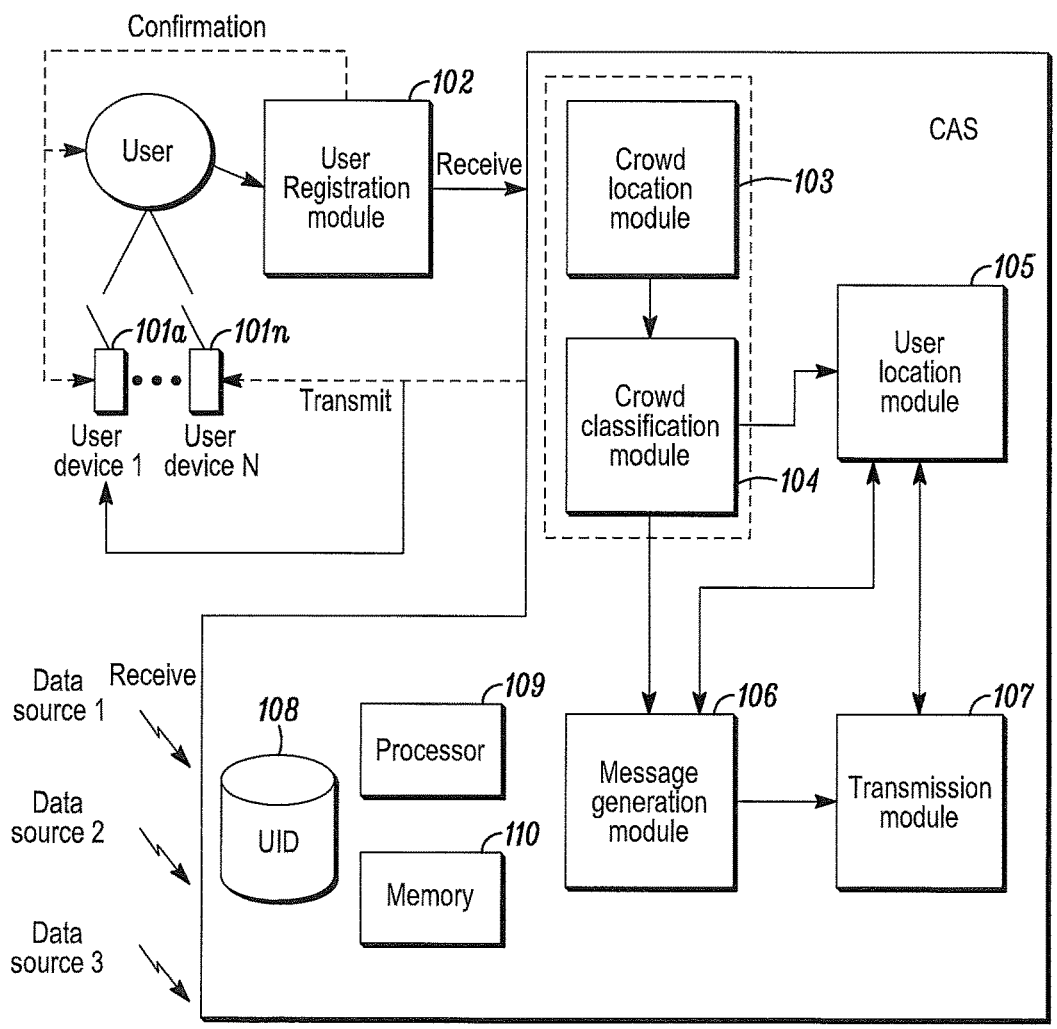
FIG. 1 of the present invention illustrates a system for generation of Crowd Alert Notifications according to an embodiment of the present invention.

FIG. 1 illustrates an exemplary crowd alert notification system in accordance with an embodiment of the present invention. The system comprises at least one user device (101a, 101n) connected to communication servers, a User Registration Module (102) and a Central Alert System (CAS) via a communication network. The user device is preferably a smart phone running an operating system for example Java, Android, Windows Mobile, Java ME, or Symbian. Examples of user devices include a traditional cell phone or other wireless communication devices with computing capability such as a smart phone, tablet, PDA etc. The user device may also be a tablet, a car-mounted system such as an in-dash navigation system, a laptop, or a specific device for example a transceiver designed primarily to provide emergency safety notification. The CAS comprises of a Crowd Location Module (103), a Crowd Classification Module (104), a User Location Module (105), a Message Generation Module (106) and a Transmission Module (107). It also comprises Processors (109), Memories (110) and user information database (108) operatively connected (not shown) to the different modules of the CAS. The User Registration Module (102) may also be included in the CAS. The Crowd Location Module (103) gathers crowd related data from various sources in the form of feeds or inputs and then sends over the aggregated data to the Crowd Classification Module (104). The Crowd Classification Module (104) filters, analyzes and classifies the gathered crowd data in order to determine the possibility of a potential threat from the identified crowd gatherings. The User Location Module (105) locates registered user(s) in the vicinity of such alarm raising crowd gathering based on the location of the user device(s) and maps such user to the location of the crowd gathering. The Message Generation Module (106) prepares and transmits alert messages to the relevant registered user devices using a Transmission Module (107). In another embodiment, the CAS is configured to iteratively re-transmit the alert message to user devices based on preferences and/or pre-defined selection criteria.

Figure 2:
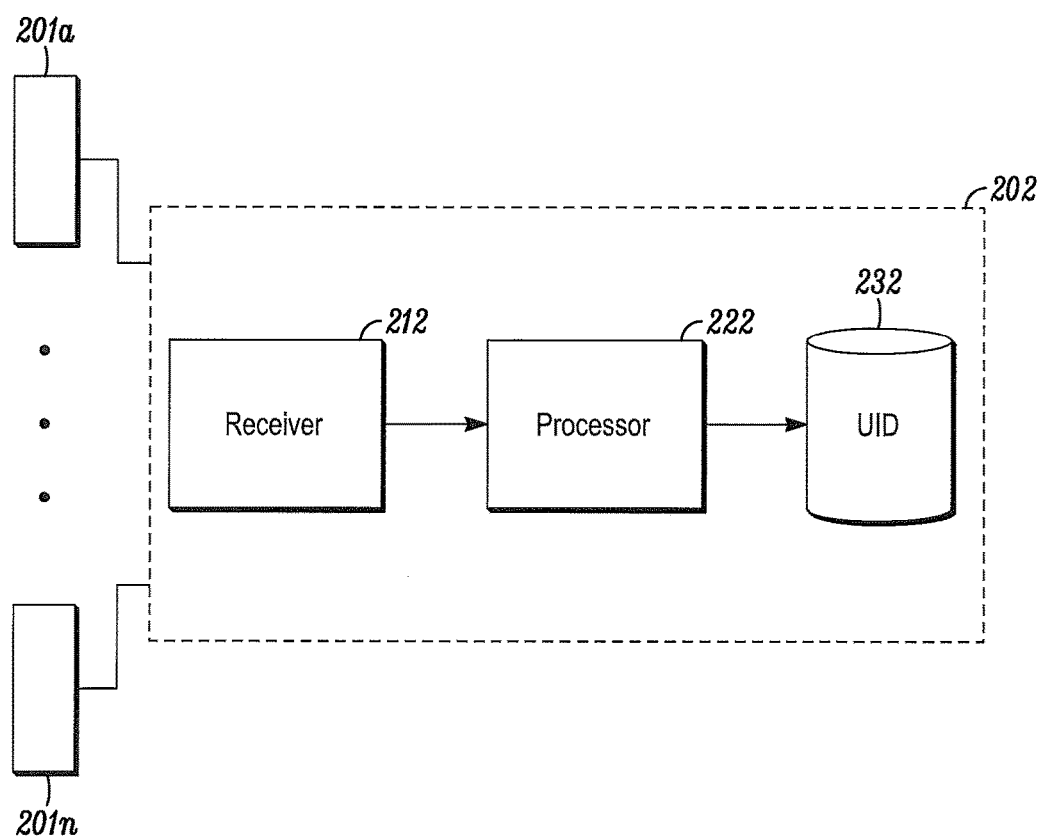
FIG. 2 of the present invention illustrates a Registration Module according to an embodiment of the present invention.

The following description will now elaborate on a Registration Module according to an embodiment of the present invention. FIG. 2 illustrates an exemplary embodiment of a User Registration Module of the CAS. Before a user device can receive any alert message from the CAS, the user device must be registered with the CAS. Registration with the CAS involves capturing user related information and user device specification and performing a two-stage confirmation process. In the first stage of confirmation, a user validates his demographic details and in the second stage the user through the user device validates the device details. In an exemplary embodiment, the registration process includes a user providing information pertaining to, for example, name, contact information, address information, social network profile information and other necessary permissions relating to a user, which would enable the CAS to create, store and access the profile of the said user(s) at the appropriate time and to transmit the security alert to the user(s). Registration details would also include identifying one or more wireless devices or user devices (201a, . . . 201n) associated with the user. The registration process may also be carried out online by providing all the required details of the user(s). A Receiver (212) in the Registration Module receives incoming request for registration from the user device(s) (201a, . . . 201n) and a processor (222) is configured to register details of a wireless electronic device in a user information database (232), which saves all the registered user(s) profiles. For example, the processor (222), operatively connected to the CAS, receives the required information from a user and stores such information in the user information database (232) for future retrieval. At the end of the user registration process, a confirmation message through e-mail or similar communication methodology is then transmitted to the user confirming that the user registration process has been successful. In the second step, the registration of the device is completed with respect to each device that will be receiving alert messages form the CAS. The confirmation message to the user device is sent through SMS or similar messaging protocol and is based on user device related data fetched from the database (232) by the processor (222).

In an embodiment of the present invention, a user of the invention may be an end-user, parent, family unit, a school, a municipality or other government organizations, a service provider, a business organization, an emergency responder, or the police. A user can always update vital information associated with the end-user and/or a user device as and when required. Updates may be accomplished using the user device, for example taking a picture using an embedded camera or using inputs of the user device, by entering updated information directly from the user device, or by entering information into a network accessible resource such as a webpage. In a preferred embodiment and as described below, the subscriber may set the CAS to send an alert notification to the user device based on only selected threat levels. For example, a user may choose to be notified only when a crowd gathering gets unruly and is likely to cause damage to life or property on a large scale. The Registration Module may be configured to manage such user defined settings.

Figure 3:
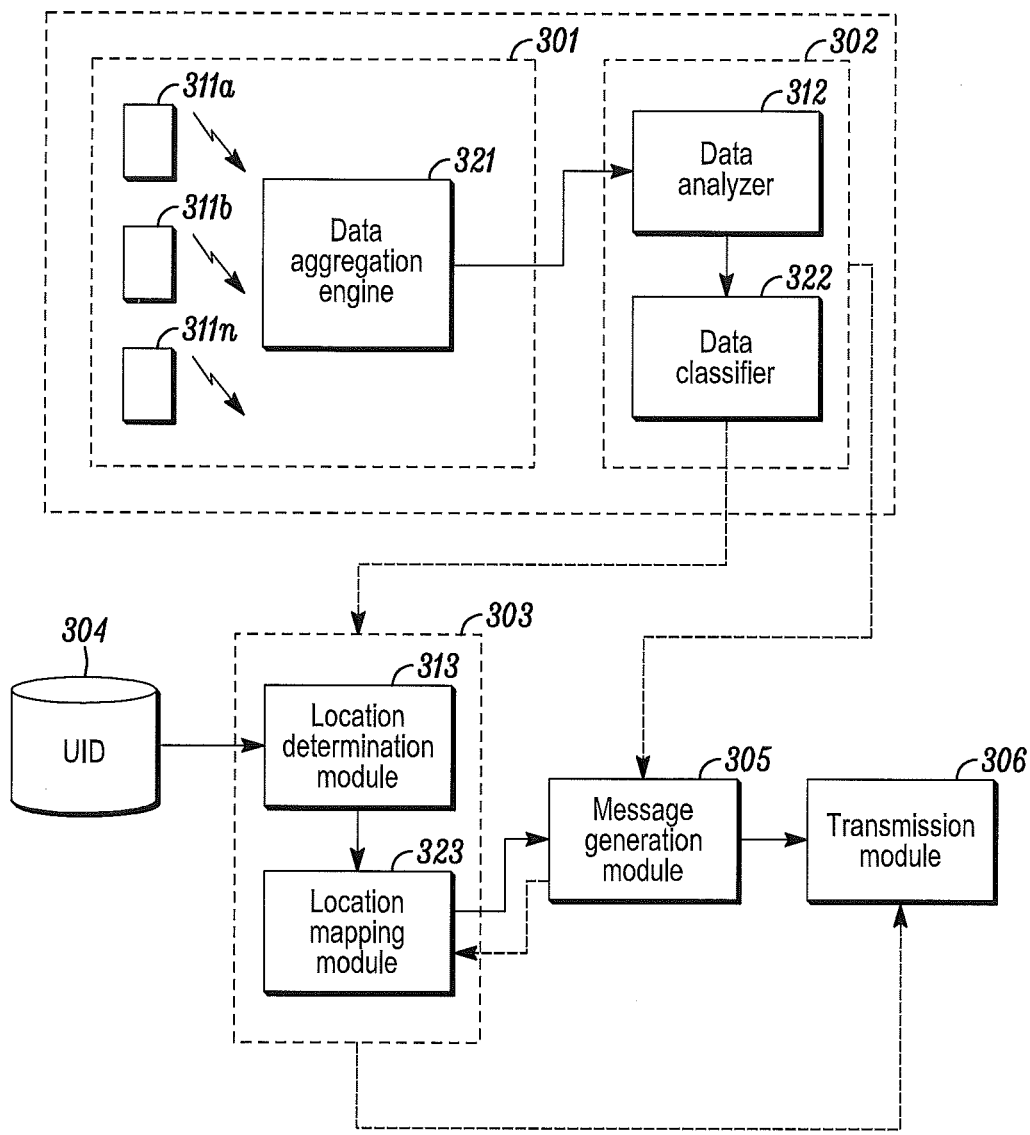
FIG. 3 of the present invention illustrates crowd gathering analysis and classification through a Crowd Location Module, a Crowd Classification Module, a User Location Module and a Message Generation Module according to an embodiment of the present invention.

The following description will now elaborate on an embodiment relating to crowd gathering analysis and classification according to an embodiment of the present invention. FIG. 3 illustrates an exemplary embodiment relating to crowd gathering analysis and classification of the CAS. The module comprises a Crowd Location Module (301), a Crowd Classification Module (302), a User Location Module (303) and a Message Generation Module (305). The Crowd Location Module (301) determines the locations of crowd gatherings, based on crowd data received from various sources, for example, from cameras located at public places, social networking sites or other related data sources. Accordingly, the Crowd Location Module comprises a Data Aggregation Engine (321) which is operatively coupled to a plurality of data acquiring devices or data sources (311a, 311b . . . 311n).

A Data Aggregation Engine (321) is used to obtain demographic experience information related to a particular event and construction of a data aggregation engine involves using known hardware features such as memory and processors for storage and processing of data. For example, the data received may include a plurality of video feeds or inputs or data that are assembled and presented to the Crowd Classification Module (302). Data may be constructed from not only video inputs, but additionally or alternatively from original or modified audio data, image data, textual data, time data, location data, orientation data, position data, acceleration data, movement data, temperature data, metadata, user data, or any other suitable sensor data acquired by data acquiring devices having one or more corresponding sensors (e.g., a mechanical sensor, a biometric sensor, a chemical sensor, a weather sensor, a radar, an infrared sensor, an image sensor, a video sensor, an audio sensor, or any other commercially suitable sensor that may construct or acquire sensor data). Contemplated data acquiring devices may include, among other things, a mobile phone, a smart phone, a camera, a tablet, a video camera, virtual reality glasses, a security camera, a computer, a laptop, or any other suitable data acquiring device. Plurality of data acquired by the multiple data acquiring devices may be sent or otherwise transmitted over a network (e.g., Internet, cellular network, LAN, VPN, WAN, parts of a personal area network, etc.) to a data aggregation engine that is preferably configured or programmed to aggregate the plurality of data from multiple venues. In the present invention the Data Aggregation Engine (321) assembles all such data which caters to the need of the system.

The Crowd Classification Module (302) comprises a Data Analyzer (312) and a Data Classifier (322) for filtration, classification and segregation of data received from the Data Aggregation Engine (321). Assembled data is sent to the Data Analyzer (312) which comprises processors and comparators (not shown) to analyze data and categorize data based on factors such as crowd density, gender ratio of the crowd, venue of the crowd gathering, reason for the crowd gathering, nature of the crowd gathering activity etc. Data from extraneous sources such as news reportings as well as any real-time data may be used by the Data Analyzer (312) to collate location based information for various crowd gatherings as retrieved from different input sources and filter the relevant data. For example, if the density of crowd gathering is less than certain predetermined value per sq. meter or the gathering is a regular prayer gathering in a temple or mosque, then the said gathering shall be considered as irrelevant for the purpose of generation of an alert. Other methods of evaluation of information received from such sources may, for example, include an assessment of whether the crowd has gathered in a particular location and also whether the crowd gathering may turn unruly based on archival information stored by the Data Analyzer (312). The Data Analyzer (312) evaluates the assembled data and sends the relevant part of the data to the Data Classifier (322) for classification of crowd gathering based on potential threat posed thereto. The data not sent to the Data classifier may be retained in the CAS for future use.

Approved and hence, relevant data is fed into the Data Classifier (322) to further categorize the crowd gathering on a pre-determined threat level scale so that appropriate alert messages may be sent to the user device(s). Based on factors such as the crowd density, gender of the crowd, reason and venue of such gathering as well as previously identified and archived similar events, threats posed by the crowd gathering may be evaluated to determine the threat level on a certain scale. In an exemplary embodiment, categorizing the crowd gathering may comprise categorizing the crowd on a scale from a to n wherein a is an integer, colour or alphabet that depicts the category of crowd gathering posing minimum threat and n is a corresponding integer, colour or alphabet that depicts the category of crowd gathering posing maximum threat. For example, a scale of 1 to 5 may be chosen, with 5 being the highest level of threat. Similarly and as followed in the USA, the Crowd Classification Module (302) may also be configured to categorize threat intensity and impact thereto as per codes identified by colors such as red being a threat on a severe level risk and green being on a low level risk of damage to life and/or property. At the time of registration as described above, a user may also customize reception of alert messages for only a particular level of threat whereby the CAS may identify aforesaid crowd gathering threat type levels and send an alert notification to the end-user based on such threat levels. For example, a user may opt to receive alert messages only for crowd gatherings whose identified threat levels are 3 or higher.

The User Location Generation Module (303) comprises a Location Determination Module (313) and a Location Mapping Module (323). The Location Determination Module (313) identifies the continuous real-time location of a registered user device in order to assess whether a user is in proximity of an alert raising crowd gathering by continuously monitoring the geo-location of the user device(s) registered by the user in the CAS. In an embodiment, the current geo-location includes the latitudinal and longitudinal location of the registered user device(s) determined by, for example, a Global Positioning system (GPS) of the communication network. Other options for determining the geo-location of a user device(s) are known and may be applied in a manner known to a person of ordinary skill in the art and include creating a visual map of the location based on the latitudinal and longitudinal location of the user(s) determined by location of user device(s) being GPS enabled. A number of different sensors and technologies known to a person having ordinary skill in the art can be used for tracking or augmenting the GPS information. A number of technologies are already in vogue where the user(s) device Wi-Fi card is tracked to get a mapping of their movement and tendencies so that they can modify the store with time. For example, Wi-Fi and Ultrawide band based timing can be used for tracking locations. For situations where the GPS system is unable to track the location of the user(s), an alternative system like the cellular modem may be preferred which can work in those situations.

The Location Determination Module (313) populates a list of current geo-locations of all the registered user devices and feeds the same in the Location Mapping Module (323). The Location Mapping Module (323) identifies user(s) proximate to the location of any classified crowd gathering as per the crowd gathering information provided by the Crowd Classification Module (302) and populates a list of all such user(s) along with their user device(s) and locations who are in a pre-determined proximity to a crowd gathering. At the time of registration, as described above, a user may also customize receiving alert messages where the user is within a certain radius of the crowd gathering. For example, a user may opt to receive alert messages for crowd gatherings in a radius of 1-5 kms. The Location Mapping Module (323) sends this list of proximate user(s) to the Message Generator Module (305).

The Message Generator Module (305), along with the proximate user list, also accesses the real-time location of the crowd gathering already stored in the User Location Module (303) and triggers an alert message which may be a short message or a call initiated to the user device(s) of the user(s). The other details may include picture or voice messages, audio clips, texts, etc. The alert message to be sent to the user(s) shall depend on the service scheme as chosen by the user(s). For example, a particular user may be interested in getting an alert message for all the identified classes of crowd gatherings whereas a different user may register in order to receive an alert notification for a crowd gathering identified as level 3 threat. The Message Generator Module (305) also prepares a customized message based on the level of threat identified by the Crowd Classification Module (302). For example, on identification of a crowd gathering threat level 3, the Message Generator Module may text a templatized message to the user device such as "UNRULY CROWD" appended with the geo-location of the crowd gathering along with other details as stored in the database.

In an alternative embodiment, the Message Generator Module (305) may initially prepare templatized messages based on the crowd gathering locations and threat levels identified before the registered user list is populated by the Location Determination Module (313) and Location Mapping Module (323). Accordingly, once the message is ready to be sent, the Location Determination Module (313) and Location Mapping Module (323) tracks the location of the users proximate to the location of the crowd gatherings by mapping the user location against the crowd gathering location data to identify the registered user devices is in the vicinity of the crowd gathering.

In another alternative embodiment, the Message Generator Module (305) may also initiate pre-active action from the user(s) by providing alternative routes that the user(s) may take to by-pass the crowd gathering. Using GPS algorithms known to a person skilled in the art and based on availability of alternate paths, the user(s) will also be prompted to use the service, selection of which may enable the user(s) to be shown alternative paths of bypassing the said crowd gathering.

As an alternate embodiment, apart from sending a notification to the user device(s), the Message Generator Module (305), based on the threat level, is also configured to generate alert messages for a secondary user group such an emergency service responder as mentioned above. For example, in a threat level five, the Message Generator Module (305) may generate additional alert messages in order to notify and initiate action from emergency responders such as fire station, police station, or medical service centres within the vicinity of the crowd gathering.

The Transmitter Module (306) receives the alert message from the Message Generation Module (305) to send it across to the user device(s) by the referred communication networks.

Figure 4:
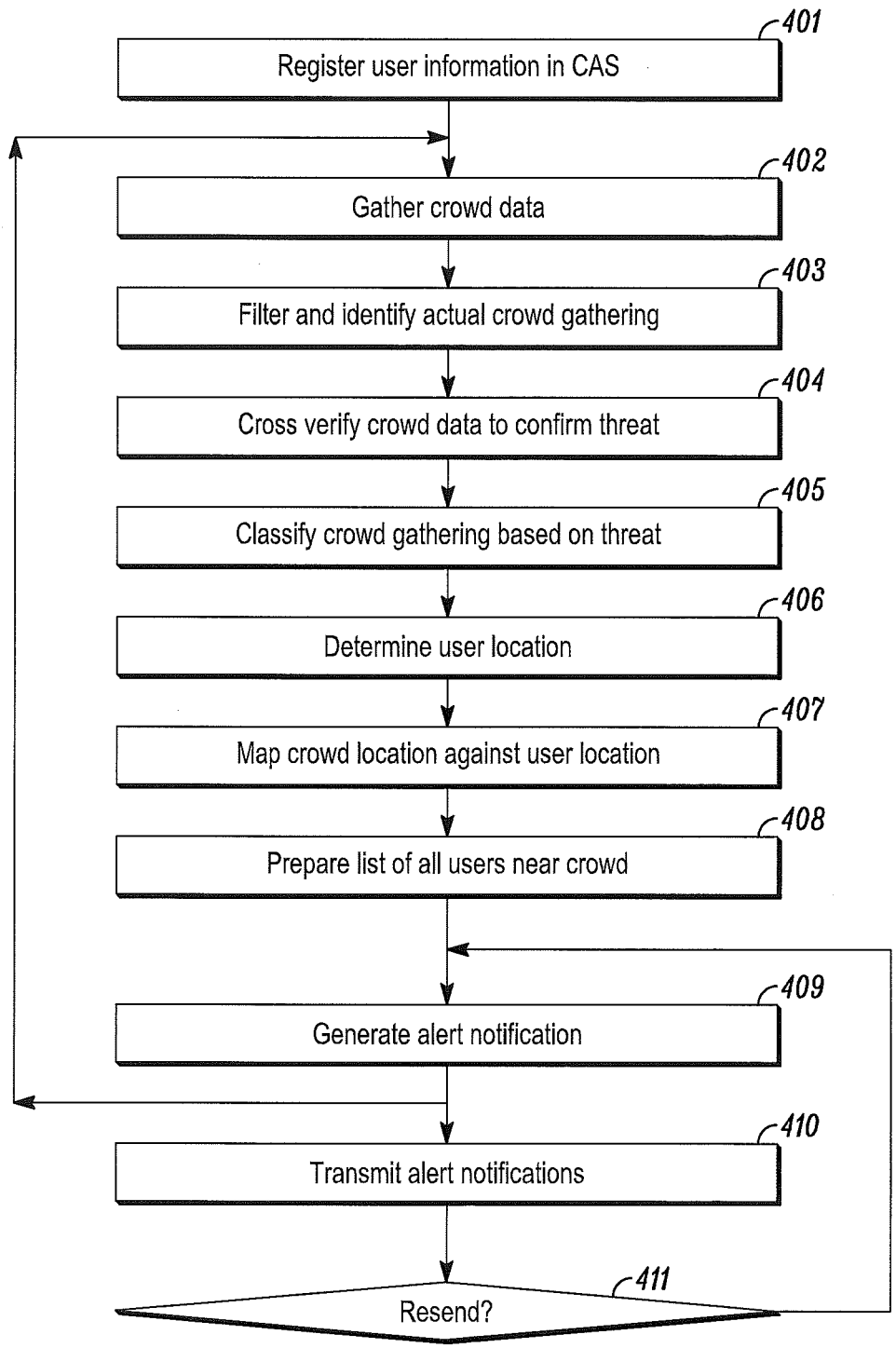
FIG. 4 of the present invention illustrates a schematic diagram of the method steps for generating a Crowd Alert Notification according to an embodiment of the present invention.

The following description will now elaborate on the method for generating a crowd alert notification. FIG. 4 illustrates exemplary steps of a method for generating a crowd alert notification. In step 401, any user(s) may register in the CAS for crowd gathering based threat identification and notification to the said user(s).

In step 402, pursuant to the step of registration, the location of crowd gatherings is gathered using data received from various data available from various data acquiring devices as well as information available over the interne such as social networking sites.

In step 403, the accumulated crowd gathering data is analyzed based on factors such as crowd density, gender ratio of the crowd gathering, venue of the crowd gathering, reason for the crowd gathering, nature of the crowd activity, etc. Based on such analysis, such crowd gathering data is categorized into any normal crowd gathering or a gathering which may turn unruly and pose a threat to any registered user in the vicinity of the crowd gathering and filtered accordingly.

In steps 404 and 405, the data categorized as unruly crowd gathering is cross verified against agency data and archived data and classified based on the threat imposed thereto. In an exemplary embodiment, threats posed by the crowd gathering may be evaluated on a scale of for example, 1 to 5 with 5 being the highest level of threat and crowd gatherings may be classified accordingly.

In step 406, the location of a registered user device is dynamically identified by the CAS. Further, user's profile in the CAS database is accessed to extract information and for any customizations relating to transmission of notifications to the user device. In an exemplary embodiment, a user may customize reception of alert messages for only a particular level of threat whereby the CAS may identify aforesaid level of threat posed by the crowd gathering and send an alert notification to the end-user based on such threat levels.

In steps 407 and 408, user locations are mapped against the location of identified unruly crowd gathering and all users who are in the proximity of a crowd gathering are determined. Further, a list of all users who are near the crowd gathering is prepared for transmission of alerts to the corresponding user devices.

In step 409, alert messages are generated for transmission to users based on threat level identified for the crowd gathering. Message may be generated as a short message or a call initiated to the user device(s) of the user(s) along with other details regarding the crowd gathering in form of picture or voice messages, audio clips, texts, etc. In an alternative embodiment, alert messages providing alternative routes that the user(s) may take to by-pass the crowd gathering may also be generated and sent.

In yet another alternate embodiment, when maximum level of threat is identified for a crowd gathering, alert messages may be generated for a list including not only the users, but also to a secondary user group such as emergency service responders, police station, hospital or emergency aid services available in the vicinity of the crowd gathering.

In step 410, the alert message is transmitted to the user devices of the respective users in the list as elaborated by step 409. In a further embodiment, the CAS may be configured to send follow-up reminders at pre-determined time intervals to the users in the above list as shown in step 411. The period of time for sending the panic alert again may be configured by a subscriber, end-user, or service provider. Further, the time periods may be set differently for the users and the secondary group as well as according to the threat level imposed by the crowd gathering.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method comprising:
   (i) receiving data from one or more data sources at a central alert system, wherein said data comprises at least a geo-location of a crowd gathering;
   (ii) processing the data to classify the crowd gathering as unruly based on a crowd density being over a threshold and the crowd gathering not being an expected gathering for the geo-location of the crowd gathering based on archival data stored in the central alert system;
   (iii) identifying a geo-location of one or more user devices in proximity to the geo-location of the crowd gathering;
   (iv) generating an alert message based on a classification that the crowd gathering is unruly; and
   (v) transmitting the alert message to the one or more user devices.

2. The method as claimed in claim 1, wherein each one of said one or more user devices is associated with at least one user registered with the central alert system.

3. The method as claimed in claim 2, wherein each one of said one or more user devices is registered with the central alert system to receive the alert message of the classification.

4. The method as claimed in claim 1, wherein the one or more data sources comprises a news service, surveillance cameras, social networking websites, third party applications, or a government agency.

5. The method as claimed in claim 1, wherein processing said data comprises categorizing the crowd gathering on a threat level scale.

6. The method as claimed in claim 5, wherein categorizing the crowd gathering comprises identifying a category ranging from a to n, wherein a and n are integers.

7. The method as claimed in claim 1, wherein the alert message comprises the data regarding the geo-location of the crowd gathering and a category of a level of threat posed by the crowd gathering.

8. The method as claimed in claim 1, wherein transmitting the alert message comprises sending the alert message via a communication network to each of the one or more user devices associated with respective ones of one or more registered users.

9. The method as claimed in claim 8, further comprising re-transmitting the alert message to each of the one or more the user devices after a pre-determined interval of time.

10. The method as claimed in claim 1, further comprising:
    (i) determining that the geo-location of the one or more user devices is in proximity to the geo-location of the crowd gathering; and
    (ii) transmitting the alert message to the one or more user devices.

11. The method as claimed in claim 1, further comprising transmitting the alert message to one or more secondary users in proximity to the geo-location of the crowd gathering, wherein said one or more secondary users comprise emergency service responders, a police station, a hospital, or emergency aid services.

12. A crowd alert system comprising:
    one or more processors;
    one or more memory devices; and
    one or more databases,
       comprising the one or more processors are configured to (a) receive data, from one or more data sources, comprising a geo-location of a crowd gathering, (b) process the data to determine when a crowd density is over a threshold and the crowd gathering is not an expected gathering for the geo-location of the crowd gathering based on archival data and, responsive thereto, to classify the crowd gathering as unruly based on a category of threat level, (c) map a geo-location of each of one or more user devices that are in proximity to the geo-location of the crowd gathering, (d) generate an alert message based on the category of the threat level posed by the crowd gathering, and (e) transmit the alert message to each of the one or more user devices based on the geo-location of each of the one or more user devices in proximity to the geo-location of the crowd gathering.

13. The system as claimed in claim 12, wherein each of the one or more user devices is associated with one or more users registered with the crowd alert system.

14. The system as claimed in claim 12, wherein the one or more data sources comprises a news service, surveillance cameras, social networking websites, third party applications, or a government agency.

15. The system as claimed in claim 12, wherein the one or more data sources are operatively connected to the crowd alert system via a communication network, a local area network, or a wide area network.

16. The system as claimed in claim 12, wherein the one or more processors are further configured to identify and filter the data received from the one or more data sources, and categorize the threat level posed by the crowd gathering on a pre-determined threat level scale.

17. The system as claimed in claim 12, wherein the one or more processors are further configured to re-transmit the alert message to each of the one or more user devices after a pre-determined interval of time.

18. The system as claimed in claim 12, wherein the one or more processors are further configured to transmit the alert message to one or more secondary users in proximity to the geo-location of the crowd gathering, wherein said one or more secondary users comprises emergency service responders, a police station, a hospital, or emergency aid services.

* * * * *